(12) United States Patent
Fukui et al.

(10) Patent No.: US 7,634,135 B2
(45) Date of Patent: Dec. 15, 2009

(54) IMAGE PROCESSING APPARATUS

(75) Inventors: Motofumi Fukui, Kanagawa (JP); Noriji Kato, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 953 days.

(21) Appl. No.: 11/144,601

(22) Filed: Jun. 6, 2005

(65) Prior Publication Data
US 2006/0093184 A1 May 4, 2006

(30) Foreign Application Priority Data
Nov. 4, 2004 (JP) ............... 2004-321017

(51) Int. Cl.
G06K 9/34 (2006.01)
G06K 9/62 (2006.01)
G06K 9/00 (2006.01)
G06K 9/46 (2006.01)
G06K 9/66 (2006.01)

(52) U.S. Cl. ............... 382/173; 382/103; 382/190; 382/225

(58) Field of Classification Search ............... 382/103, 382/173, 190
See application file for complete search history.

(56) References Cited

U.S. PATENT DOCUMENTS

| | | | | |
|---|---|---|---|---|
| 5,978,519 A | * | 11/1999 | Bollman et al. | 382/282 |
| 6,545,743 B1 | * | 4/2003 | Luo et al. | 355/18 |
| 6,553,131 B1 | * | 4/2003 | Neubauer et al. | 382/105 |
| 7,133,571 B2 | * | 11/2006 | Cheatle | 382/282 |
| 7,212,668 B1 | * | 5/2007 | Luo et al. | 382/165 |

FOREIGN PATENT DOCUMENTS

JP    A 2000-48184    2/2000

* cited by examiner

*Primary Examiner*—Brian P Werner
*Assistant Examiner*—Jose M Torres
(74) *Attorney, Agent, or Firm*—Oliff & Berridge, PLC

(57) ABSTRACT

The invention is an image processing apparatus for identifying a target area used as a target of processing among image data and performing predetermined processing, and is the image processing apparatus in which the image data is divided into plural partial areas based on a predetermined division rule and each of these plural partial areas is used as an attentional partial area and based on a feature quantity related to at least one of values or the number of pixels included in the attentional partial area and a feature quantity included in at least one of the other partial areas adjacent to each of the partial areas, a saliency feature value related to the attentional partial area is calculated and a target area used as a target of predetermined processing is decided based on the saliency feature value every each of the partial areas.

7 Claims, 3 Drawing Sheets

IMAGE PROCESSING APPARATUS

BACKGROUND OF THE INVENTION

1. Field of the Invention

The present invention relates to an image processing apparatus for identifying an attentional part from among image data and performing predetermined processing with respect to the attentional part, and particularly to improvements in processing for identifying the attentional part.

2. Background Art

An art for recognizing a desired object from two-dimensional image data regardless of moving images and static images is emphasized and many applications are expected. Hence, many techniques have been proposed conventionally. One of the techniques is a technique called a template matching method. The template matching method is a technique widely used in actual application examples, but there is a problem that unless information as to what place of image data a desired object is present is given separately, it becomes necessary to scan over the whole image data and processing slows.

Therefore, an art for defining a feature image pattern with respect to a desired object and limiting an area to be scanned from image data used as a target of processing using the defined image pattern has been proposed conventionally. Specifically, there is an example of limiting an area of scanning using "flesh color" as a feature of color or using "elliptic shape" as approximate shape when the desired object is a face of a person.

For example, in an art disclosed in JP-A-2000-48184, after flesh color is extracted, a projection distribution of the area is generated and a face area attempts to be identified by extracting a parabola from the projection distribution.

However, also in the method disclosed in JP-A-2000-48184, there are the following problems. That is, first, it is known that "flesh color" is widely distributed on color space and its distribution range varies depending on a reflection state etc. of light. Also, in the case of utilizing a feature of a shape, it is difficult to extract a shape of a parabola from an edge image for a curve figure which is not a complete circle. This is because there are cases where a contour of a face is blocked by hair etc. and a figure is divided or the contour merges into the background and an edge cannot be detected correctly.

That is, in the conventional method described above, there is a problem that an attentional part for processing such as face detection cannot be identified efficiently.

SUMMARY OF THE INVENTION

The invention has been implemented in view of the actual circumstances, and one object of the invention is to provide an image processing apparatus capable of improving efficiency of identification of an attentional part by identifying the attentional part used as a target of processing based on a feature quantity related to saliency instead of a feature of color or shape.

The invention for solving the problems of the conventional example described above is an image processing apparatus for identifying a target area used as a target of processing among image data and performing predetermined processing, and is characterized by including a division unit for dividing the image data into plural partial areas based on a predetermined division rule, a saliency calculation unit in which each of the plural partial areas is used as an attentional partial area and based on a feature quantity related to at least one of values or the number of pixels included in the attentional partial area and a feature quantity included in at least one of the other partial areas adjacent to each of the partial areas, a saliency feature value related to the attentional partial area is calculated to generate a saliency feature value every each of the partial areas, and a detecting unit for deciding a target area used as a target of predetermined processing based on the saliency feature value every the partial area.

Thus, efficiency of identification of an attentional part can be improved by identifying the attentional part used as a target of processing based on a feature quantity related to saliency determined in relation to an adjacent part instead of a feature of color or shape.

Here, the saliency calculation unit may calculate the saliency feature value based on a statistic related to values of pixels included in each of the partial areas with respect to each of the plural partial areas, or may calculate the saliency feature value based on the quantity related to the number of pixels included in each of the partial areas with respect to each of the plural partial areas.

Further, the saliency feature value may be the quantity related to the number of pixels present in the boundary between an attentional partial area and other partial areas. Also, the saliency feature value may be determined in relation to a difference between plural other partial areas adjacent to an attentional partial area in the saliency feature value. Here, the saliency feature value may be normalized by a predetermined method.

Also, one aspect of the invention is an image processing method for identifying a target area used as a target of processing among image data and performing predetermined processing, and is characterized by including a step of dividing the image data into plural partial areas based on a predetermined division rule, a step in which each of the plural partial areas is used as. an attentional partial area and based on a feature quantity related to at least one of values or the number of pixels included in the attentional partial area and a feature quantity included in at least one of the other partial areas adjacent to each of the partial areas, a saliency feature value related to the attentional partial area is calculated to generate a saliency feature value every each of the partial areas, and a step of deciding a target area used as a target of predetermined processing based on the saliency feature value every the partial area.

Further, another aspect of the invention is an image processing program for identifying a target area used as a target of processing among image data and performing predetermined processing, and is characterized by making a computer execute a procedure for dividing the image data into plural partial areas based on a predetermined division rule, a procedure in which each of the plural partial areas is used as an attentional partial area and based on a feature quantity related to at least one of values or the number of pixels included in the attentional partial area and a feature quantity included in at least one of the other partial areas adjacent to each of the partial areas, a saliency feature value related to the attentional partial area is calculated to generate a saliency feature value every each of the partial areas, and a procedure for deciding a target area used as a target of predetermined processing based on the saliency feature value every the partial area.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
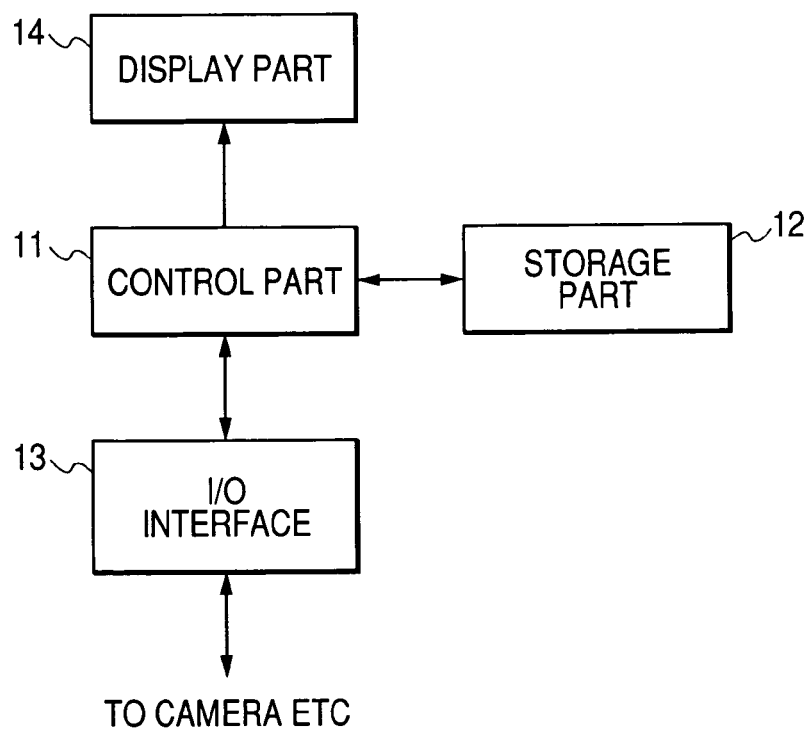
FIG. 1 is a block diagram showing a configuration example of an image processing apparatus according to an embodiment of the invention.

An embodiment of the invention will be described with reference to the drawings. An image processing apparatus according to the embodiment of the invention is configured to include a control part 11, a storage part 12, an I/O interface 13 and a display part 14 as shown in FIG. 1.

The control part 11 can be implemented by a CPU etc. and operates according to a program stored in the storage part 12. This control part 11 basically executes a processing for detecting an image of a desired object (for example, a face part of a person) from image data inputted through the I/O interface 13. Also, in the present embodiment, this control part 11 executes a preprocessing for identifying a search area (an area of a processing target) in the processing for detecting the image of the desired object before the processing for detecting the image of the desired object. The contents of the processing of this control part 11 will be described below.

The storage part 12 is a record medium which can be read by a computer and stores a program executed by the control part 11. Also, this storage part 12 operates as working memory for storing various data necessary in processing of the control part 11. Specifically, this storage part 12 is configured to include a disk device such as a hard disk or a memory element such as RAM or ROM.

The I/O interface 13 is connected to an external device such as a camera device, and image data is acquired from the external device and is outputted to the control part 11. Also, this I/O interface 13 outputs various data to the external device according to instructions inputted from the control part 11.

The display part 14 is, for example, a display, and displays information according to instructions inputted from the control part 11.

Next, the contents of processing of the control part 11 will be described. In the description of the present embodiment, for the sake of simplicity, it is assumed that image data inputted through the I/O interface 13 is a static image, but also for a moving image, similar processing can be performed with respect to each of the static image frames included in the moving image. Also, it is assumed that a desired object used as a target of detection is a face of a person herein, but the desired object in the present embodiment is not limited to this.

The control part 11 of the present embodiment is means constructed so that when a person sees a photograph of a face of a person, it is noted that a position, a size, a direction, etc. of the face can easily be identified from among the photograph and processing for simulating the fact that the face is perceived particularly noticeably among the whole image as visual characteristics of the person is performed. Specifically, in the present embodiment, this processing for simulating the visual characteristics of the person is implemented using processing of area division.

Figure 2:
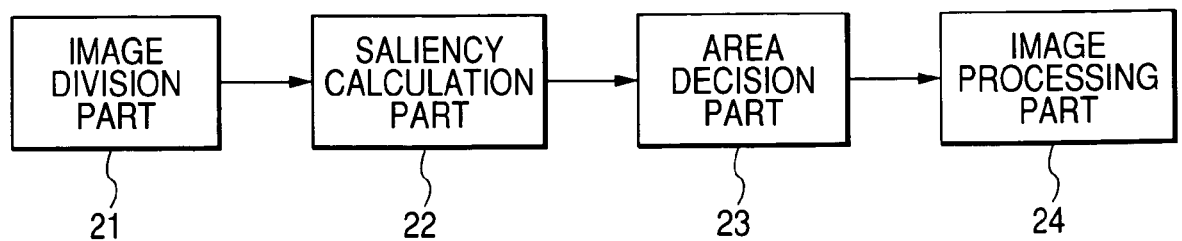
FIG. 2 is a block diagram showing a functional configuration example of the image processing apparatus according to the embodiment of the invention.

The specific contents of processing executed by this control part 11 are configured to include an image division part 21, a saliency calculation part 22, an area decision part 23 and an image processing part 24 as shown in FIG. 2. Each of the parts of this processing will specifically be described below.

Image Division Part

The image division part 21 divides image data inputted through the I/O interface 13 into plural partial areas based on a predetermined division rule. Specifically, the image data inputted through the I/O interface 13 is stored in the storage part 12 by the control part 11. Each of the pixels of this image data is represented by, for example, 256 levels of gray of each color of RGB.

The image division part 21 first generates a feature vector. This feature vector is, for example, a five-dimensional vector (x, y, l, a, b) obtained by combining pixel values (l, a, b) in l*a*b color space and coordinates (x, y) of each of the pixels. Incidentally, here, a value of RGB color space is converted into L*a*b to obtain the five-dimensional vector, and this is because luminance is taken in a feature quantity. For example, when a desired object is an object other than a face and a sky blue part is detected, in order to take a blue in the feature quantity, the value of RGB color space may be used as it is or may be converted into a value of other color space such as YUV according to the properties of the desired object.

Incidentally, in the case of using a value of any color space, each of the elements of pixel values is normalized so that, for example, the minimum value becomes 0 and the maximum value becomes 255.

Next, the image division part 21 implements area division by a k-means method using this feature vector. In the k-means method, image data is initially divided into a predetermined aspect previously. Then, the final division result is obtained by repeating processing for reclassifying a target so as to obtain a division result with higher evaluation referring to a predetermined evaluation criterion. Since there have already been many examples etc. of mounting of this k-means method, detailed description is omitted herein.

Incidentally, here, the evaluation criterion is defined by the following evaluation formula. An evaluation value Dis calculated by the evaluation formula here in is defined as (square of) a weighted Euclidean distance of a barycentric vector of an area (hereinafter called a subarea) related to division and a feature vector of a pixel. That is, it is defined as Mathematical formula 1.

Mathematical formula 1

$$Dis(i,m(t))=(x_i-x_{m(t)})^2+(y_i-y_{m(t)})^2+p\{(l_i-l_{m(t)})^2+(a_i-a_{m(t)})^2+(b_i-b_{m(t)})^2\} \quad (1)$$

Here, $(x_i, y_i, l_i, a_i, b_i)$ is a feature vector of a pixel i, and $(x_m(t), y_m(t), l_m(t), a_m(t), b_m(t))$ is a barycentric vector of a subarea M(t) of the t-time trial division. Incidentally, the barycenter of a subarea can be defined as a value in which the sum of feature vectors with respect to pixels included in the subarea is divided by the number of pixels included in the subarea. Also, p is a weight assigned to metric space with respect to color space and could be set by a real number value such as p=0.015.

The image division part 21 calculates an evaluation value Dis (i, M(t)) corresponding to each of the subareas M(t) with respect to a pixel i. Then, it is decided that the pixel i belongs to the subarea (optimum subarea) in which this evaluation value Dis (i, M(t)) is minimized, and the pixel i is associated with information for identifying the optimum subarea for its pixel, and the pixel and the information are stored in the storage part 12. By performing this processing with respect to each of the pixels i, a subarea M(t+l) in the next trial is identified.

In the present embodiment, position information is included in the feature vector, so that mutual pixels present in distant positions even for the substantially same color are set so as to belong to mutually different subareas.

This trial maybe be made by predetermined times (for example, 20 times) or may be made repeatedly using a ratio of variations in an area between trials (a ratio as to how many pixels a subarea belonged is changed) as an end condition.

For example, in the case of the present embodiment, in order to recognize images of various large and small faces, as initial division, one image data is divided into a total of 603 division areas, specifically, seven ways of 4 (2 times 2) divisions, 9 (3 times 3) divisions, 16 (4 times 4) divisions, 49 (7 times 7) divisions, 100 (10 times 10) divisions, 169 (13 times 13) divisions, and 256 (16 times 16) divisions, respectively. That is, in the initial division state, each of the pixels i belongs to seven subareas, but once the subarea is updated, the pixel i is updated so as to belong to any one of the subareas in principle.

Incidentally, in order to reduce a processing load of area division, when an image is divided into subareas of n times n, a size of image data may be decreased so that a length of a short side of the image becomes pixels of 8 times n. Also, in the case of calculating evaluation values by the k-means method, the evaluation values may be calculated only for the subareas in which the barycentric coordinates are present inside a square of a predetermined number (for example, 25) of pixels around an attentional pixel i. In this case, when there is no subarea for the pixel i, the subarea for the pixel i is not updated.

Incidentally, here, the image division part 21 divides an image into plural areas using a clustering technique such as the k-means method, but when a pixel value is included as a feature vector used as a source of a saliency feature value of the saliency calculation part 22 later in the case of making this division, clustering may be executed using a value in the same color space as color space for representing the pixel value.

Further, this image division part 21 may be means for dividing image data into an arbitrary number (n times m) of rectangular subareas simply.

Saliency Calculation Part

Figure 3:
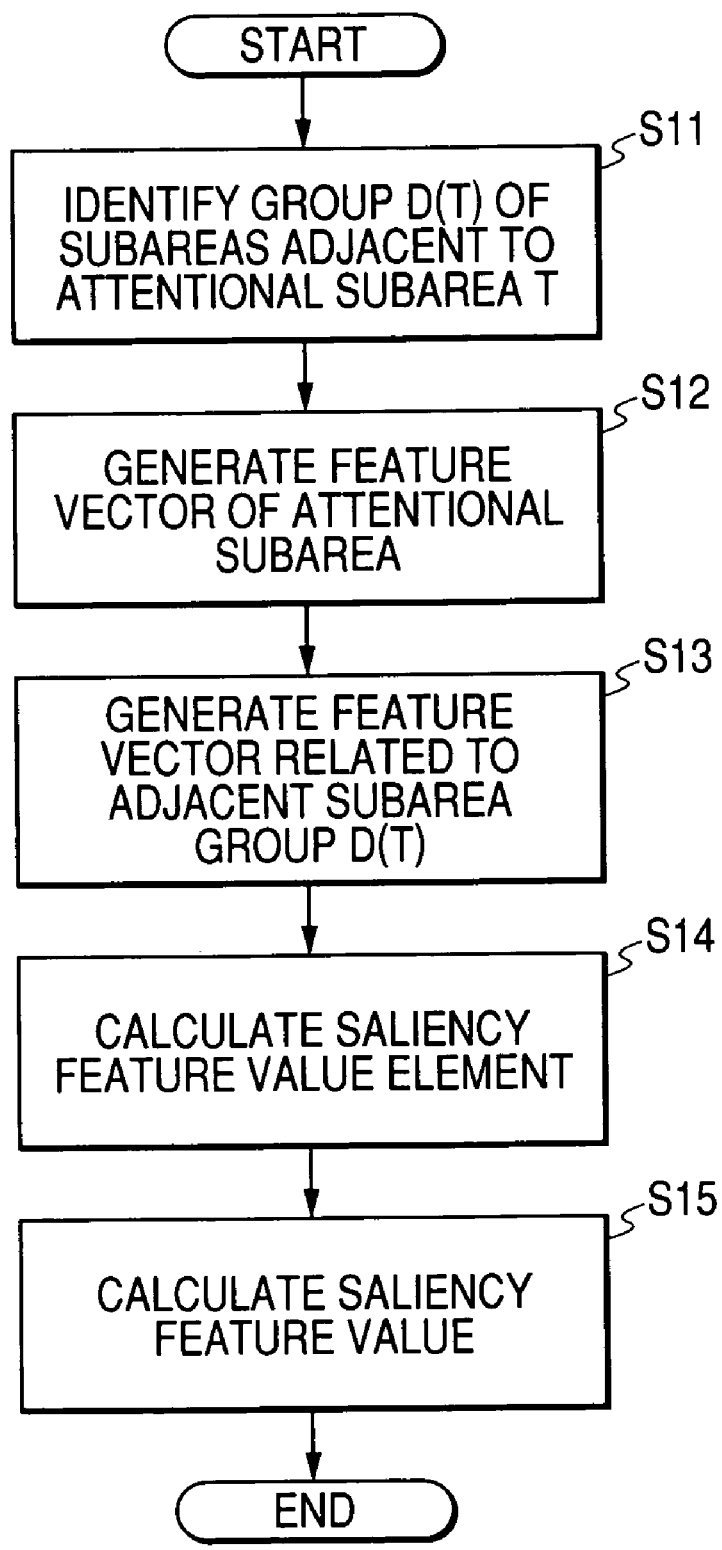
FIG. 3 is a flowchart showing a calculation processing example of a saliency feature value.

The saliency calculation part 22 calculates a saliency feature value related to at least one of a value or the number of pixels included in each of the subareas with respect to each of the plural subareas (partial areas) generated by the image division part 21. Specifically, this saliency calculation part 22 sequentially selects each of the subareas as attentional subareas, and executes processing shown in FIG. 3 with respect to the attentional subareas selected respectively. That is, the saliency calculation part 22 selects a set D(T) of other subareas (other than the attentional subarea) adjacent to this attentional subarea T (S11).

Specifically, with respect to each of the pixels included in the attentional subarea T, subareas to which pixels adjacent to eight areas (eight areas of top left, top, top right, left, right, bottom left, bottom and bottom right) in the vicinity of the pixels belong are checked and when the subarea is not the attentional subarea T, the subarea to which the adjacent pixel belongs is included in the set D(T) of the other adjacent subareas. In this case, the number of pixels adjacent to the pixels inside the attentional subarea (that is, the number related topixels present in the boundary between the attentional subarea and the other subareas (see FIG. 4)) is counted every subarea included in D(T), and the subarea in which this number is less than a predetermined threshold value may be eliminated from D(T). Also, this count value may be associated with each of the subareas included in D(T) and may be stored in the storage part 12.

Next, the saliency calculation part 22 generates a feature vector FT=(lT, aT, bT, sT) related to the attentional subarea T (S12). Here, lT, aT, bT refer to an average (barycenter) as a statistic of l*a*b values of pixels included in the attentional subarea T, and sT indicates the number of pixels included in the attentional subarea T.

Then, an average feature vector FD(T)=(lD(T), aD(T), bD(T), sD(T)) about the subareas included in the set D(T) is generated (S13). Here, lD(T) etc. refer to an average of element values of the feature vectors in each of the subareas included in the set D(T), that is, Mathematical formula 2. Incidentally, ||D(T)|| is the number of subareas included in the set D(T) (the number of adjacent subareas). The saliency calculation part 22 calculates a saliency feature value element S (T, f) about a feature element f (any of l, a, b, s) related to the attentional subarea T by Mathematical formula 3 (S14). That is, the saliency feature value element is basically a value in which with respect to one of feature quantity elements of the attentional subarea, the sum of square values of differences between its element and corresponding elements in each of the adjacent subareas is divided by the number of adjacent subareas (||D(T)||). Here, it may obtain the sum total by multiplying a value of the difference between the elements by a weight based on the number of pixels present in the boundary between the attentional subarea and the other subareas in the case of calculating the difference between the elements. Further, this saliency feature value element is normalized so that the minimum value becomes 0 and the maximum value becomes 100 (description of Norm in Mathematical formula 2 indicates that this normalization is performed). That is, it is defined as Mathematical formula 4. Here, min is the minimum value of x and max is the maximum value of x.

$$F_{D(T)} = \frac{\sum_i F_{Di(T)}}{\|D(T)\|} \qquad \text{Mathematical formula 2}$$

$$S(T, f) = Norm\left[\frac{\sum_{D \in D(T)} (f_T - f_D)^2}{\|D(T)\|}\right] \qquad \text{Mathematical formula 3}$$

$$Norm(x) = \frac{100(x - \min)}{\max - \min} \qquad \text{Mathematical formula 4}$$

Further, the saliency calculation part 22 calculates a saliency feature value S (T, D) with respect to the periphery areas of the attentional subarea T by Mathematical formula 5 (S15). Here, Σ indicates that the sum every element is calculated. Here, the saliency feature value is also normalized so that the minimum value becomes 0 and the maximum value becomes 100.

$$S(T, D) = Norm\left[\sum_f S(T, f)\right] \qquad \text{Mathematical formula 5}$$

This saliency feature value S (T, D) is a value which becomes larger as the attentional subarea is conspicuous visually as compared with the subareas of the periphery of the attentional subarea. Here, color or size is used as the feature vector, but depending on the contents of processing performed later, the quantity indicating shape or curvature, etc. may be included in the feature vector.

The saliency calculation part 22 associates the saliency feature value S (T, D) calculated for each of the subareas with information for identifying each of the subareas, and stores the saliency feature value and the information in the storage part 12.

Area Decision Part

The area decision part 23 decides a target area used as a target of predetermined processing based on the saliency feature value calculated every subarea. Specifically, the saliency feature value which is more than or equal to a predetermined threshold value Th is selected from among the saliency feature quantities for each of the subareas stored in the storage part 12, and the subarea identified by the information associated with the selected saliency feature value is selected as the target area of processing.

Also, instead of the fixed threshold value Th, for example, the subareas of the number of top predetermined ratios (for example, 40%) of the saliency feature quantities may be selected from among each of the subareas.

Also, using the feature vector FT of each of the selected subareas, the subareas with a value resulting in, for example, experimentally, $52 \leq \sigma l \leq 2186$, $3 \leq \sigma a \leq 700$, $1 \leq \sigma b \leq 437$ with respect to, for example, variance values ($\sigma l$, $\sigma a$, $\sigma b$, respectively) of pixel values l*a*b may further be narrowed and selected from the selected subareas. Further, a threshold value related to absolute values of the pixel values may be set.

Further, the subarea in which the size sT is less than the square of 1/20 with respect to a short side of image data after reduction may be eliminated from the selected subareas.

The area decision part 23 further generates information for drawing a window used as a target of later processing based on information about the selected subareas.

Specifically, the area decision part 23 defines a square area in which the planar dimension becomes closest to sT around the barycenter (average of a position) (xT, yT) of each of the pixels included in the selected subareas as a window, and outputs information for identifying the defined window.

Further, this area decision part 23 may generate four windows in which the center of this window is respectively shifted from right to left and up and down by 0.2, and output information for identifying a total of five windows.

Image Processing Part

The image processing part 24 performs processing for detecting a face image part using a window on image data identified by information outputted by the area decision part 23 as a target of processing in the present embodiment. This processing may be a template matching method widely known. Then, this image processing part 24 outputs a result of the detection processing to the display part 14 etc.

Operation

According to the present embodiment, after image data inputted is divided into plural partial areas, a saliency feature value based on a feature quantity of the partial area itself and a feature quantity of the partial areas adjacent to it is calculated with respect to each of the partial areas and using this saliency feature value, the partial area with, for example, a high saliency feature value is identified as an area used as a target of processing. Also, an area with predetermined shape around the barycenter of the partial area with the high saliency feature value is identified as an area used as a target of processing. Thus, efficiency of identification of an attentional part for processing such as face detection can be improved by identifying the attentional part used as a target of processing based on a feature quantity related to saliency from the periphery instead of a feature of color or shape.

Another example of calculation of saliency feature value

Also, in the example described above, the saliency feature value has been defined as a value which becomes larger as the attentional subarea is conspicuous visually as compared with the subareas of the periphery of the attentional subarea, but it may further be related to a difference between the subareas (plural other subareas adjacent to the attentional area) of the periphery in the saliency feature value. This is based on the idea that the saliency feature value of the attentional subarea should become large as the difference in saliency of images of the periphery is small.

Specifically, a saliency degree S (D, f) in an element f of a feature vector of a set D(T) of subareas adjacent to an attentional subare a T is defined as Mathematical formula 6. Here, fDi, fDj are elements f of the feature vector, and Di, Dj indicate mutually different adjacent subareas belonging to the set D(T). Also, p(Di, Dj)=1 means that these mutually different subareas Di and Dj are also in a state of being adjacent mutually. Then, ||Dp|| indicates the total number of pairs of Di and Dj in a state of being adjacent mutually. That is, the sum in Mathematical formula 4 is a value calculated over pairs of the mutually adjacent subareas among the adjacent subareas adjacent to the attentional subarea.

$$S(D, f) = Norm\left[\frac{\sum_{Di,Dj \in D(T), p(Di,Dj)=1} (f_{Di} - f_{Dj})^2}{\|D_p\|}\right]$$ Mathematical formula 6

Figure 4:
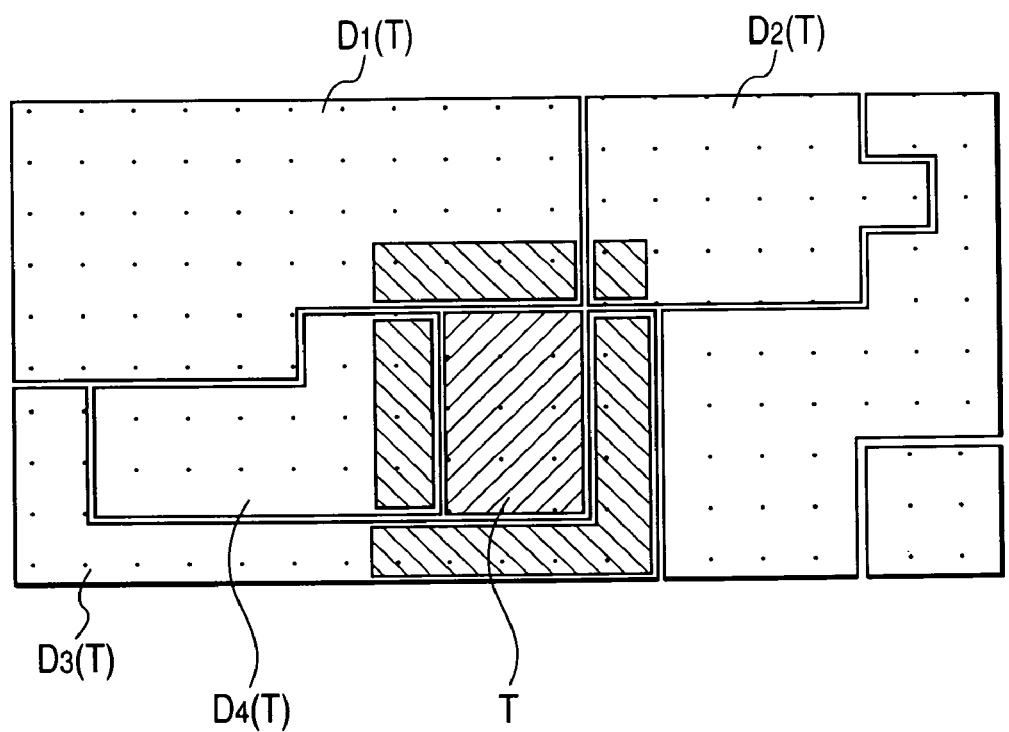
FIG. 4 is an explanatory diagram showing an example of processing with respect to subareas.

When the subareas are set as shown in FIG. 4 schematically, the subareas adjacent to the attentional subarea T are four subareas ranging from D1 (T) to D4 (T). In this case, pairs of Di and Dj in a state of being adjacent mutually are five pairs (a pair of D1 and D2, a pair of D1 and D3, a pair of D1 and D4, a pair of D2 and D3, and a pair of D3 and D4). That is, D2 is not adjacent to D4, so that it is not added to the calculation herein.

The saliency degree D (D, f) calculated in Mathematical formula 4 means that variations in the periphery in the quantity indicating elements of the feature vector are large as this saliency degree is large, and means that it is uniform as this saliency degree is small. Then, setting is made so that the saliency feature value of the attentional subarea becomes high as this is uniform.

Therefore, the total saliency degree S (D, D) of the set D(T) is defined as Mathematical formula 7, and the saliency feature value S(T) of the attentional subarea T is defined as Mathematical formula 8. Here, w is a weight related to the total saliency degree. As a value of this S(T) approximates to 100, it is considered that the attentional subarea T is conspicuous visually with respect to the periphery, and as the value approximates to 0, it is considered that the attentional subarea T is not conspicuous with respect to the periphery.

$$S(D, D) = Norm\left[\sum_f S(D, f)\right]$$ Mathematical formula 7

$$S(T) = Norm[S(T, D) - w \times S(D, D)]$$ Mathematical formula 8

In the case of using the saliency feature value S(T) calculated by this modified example, when the periphery is flat and the center is conspicuous, an area related to the center is selected as a target of processing.

What is claimed is:

1. An image processing apparatus for identifying a target area used as a target of processing among image data and performing predetermined processing, comprising:
   a processor device controlling a plurality of units, including:
   a division unit for dividing the image data into plural partial areas based on a predetermined division rule;
   a feature quantity generator that generates a feature quantity for each of the partial areas, the feature quantity being calculated from at least one of a value in a color space or a number of pixels included in the partial area;
   a saliency calculation unit that evaluates each partial area and calculates a saliency feature value for each of the partial areas; and
   a detecting unit for deciding a target area used as a target of predetermined processing based on the saliency feature value of each of the partial areas,
   wherein the saliency feature value is calculated based on (1) the feature quantity of the partial area being evaluated, (2) the feature quantities of partial areas adjacent to the partial area being evaluated, and (3) a number of pixels in areas between the partial area being evaluated and the partial areas adjacent to the partial area being evaluated.

2. The image processing apparatus as claimed in claim 1, wherein
   the saliency calculation unit calculates the saliency feature value based on a statistic related to values of pixels included in each of the partial areas with respect to each of the plural partial areas.

3. The image processing apparatus as claimed in claim 1, wherein
   the saliency calculation unit calculates the saliency feature value based on the quantity related to the number of pixels included in each of the partial areas with respect to each of the plural partial areas.

4. The image processing apparatus according to claim 1, wherein
   the saliency feature value is determined in relation to a difference between plural other partial areas adjacent to an attentional partial area in the saliency feature value.

5. The image processing apparatus according to claim 1, wherein
   the saliency feature value is normalized by a predetermined method.

6. An image processing method for identifying a target area used as a target of processing among image data and performing predetermined processing, comprising:
   dividing the image data into plural partial areas based on a predetermined division rule;
   generating a feature quantity for each of the partial areas, the feature quantity being calculated from at least one of a value in a color space or a number of pixels included in the partial area;
   evaluating each partial area and calculating a saliency feature value for each of the partial areas; and
   deciding a target area used as a target of predetermined processing based on the saliency feature value of each of the partial areas,
   wherein the saliency feature value is calculated based on (1) the feature quantity of the partial area being evaluated, (2) the feature quantities of partial areas adjacent to the partial area being evaluated, and (3) a number of pixels in areas between the partial area being evaluated and the partial areas adjacent to the partial area being evaluated, and
   wherein the above steps are performed by a processor.

7. A computer-readable storage medium executable by a computer and storing an image processing program for identifying a target area used as a target of processing among image data and performing predetermined processing, the image processing program for making a computer execute:
   dividing the image data into plural partial areas based on a predetermined division rule;
   generating a feature quantity for each of the partial areas, the feature quantity being calculated from at least one of a value in a color space or a number of pixels included in the partial area;
   evaluating each partial area and calculating a saliency feature value for each of the partial areas; and
   deciding a target area used as a target of predetermined processing based on the saliency feature value of each of the partial areas,
   wherein the saliency feature value is calculated based on (1) the feature quantity of the partial area being evaluated, (2) the feature quantities of partial areas adjacent to the partial area being evaluated, and (3) a number of pixels in areas between the partial area being evaluated and the partial areas adjacent to the partial area being evaluated.

* * * * *